US010889327B2

(12) United States Patent
Lanard et al.

(10) Patent No.: US 10,889,327 B2
(45) Date of Patent: Jan. 12, 2021

(54) STRUCTURE FOR A MOTOR VEHICLE FRONT END

(71) Applicant: Valeo Systemes Thermiques, Le Mesnil Saint Denis (FR)

(72) Inventors: Jean-Louis Lanard, Le Mesnil Saint Denis (FR); Sergio Da Costa Pito, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 34 days.

(21) Appl. No.: 16/313,627

(22) PCT Filed: May 24, 2017

(86) PCT No.: PCT/FR2017/051307
§ 371 (c)(1),
(2) Date: Dec. 27, 2018

(87) PCT Pub. No.: WO2018/002460
PCT Pub. Date: Jan. 4, 2018

(65) Prior Publication Data
US 2019/0315407 A1    Oct. 17, 2019

(30) Foreign Application Priority Data

Jun. 30, 2016   (FR) ...................... 16 56160

(51) Int. Cl.
*B62D 25/08*    (2006.01)
*B62D 21/15*    (2006.01)
*B62D 29/00*    (2006.01)

(52) U.S. Cl.
CPC ........... *B62D 21/152* (2013.01); *B62D 25/08* (2013.01); *B62D 25/085* (2013.01); *B62D 29/00* (2013.01)

(58) Field of Classification Search
CPC .. B62D 25/082; B62D 25/084; B62D 25/085; B62D 21/152; B62D 29/00
See application file for complete search history.

(56) References Cited

U.S. PATENT DOCUMENTS 6,547,317 B1 *   4/2003   Cheron ................ B62D 25/084
                                                           180/68.4
6,631,562 B1 *   10/2003  Balzer ..................... B05D 7/14
                                                           29/458

(Continued)

FOREIGN PATENT DOCUMENTS

EP    1101689 A1    5/2001
EP    1778536 A1    5/2007

(Continued)

OTHER PUBLICATIONS

International Search Report and Written Opinion Issued in Corresponding PCT Application No. PCT/FR2017/051307, dated Sep. 8, 2017 (12 Pages with English Translation of International Search Report).

*Primary Examiner* — Gregory A Blankenship
(74) *Attorney, Agent, or Firm* — Osha Bergman Watanabe & Burton LLP

(57) ABSTRACT

The invention concerns a structure for a motor vehicle front end, comprising a crossmember and at least one column (4) rigidly connected to the crossmember, the crossmember extending longitudinally in a so-called main direction, characterised in that said at least one column (4) comprises a first set (10) of reinforcing ribs (11) on at least a portion (12) of an outer surface of said at least one column (4), each reinforcing rib (11) extending in a direction (D) parallel to the main direction of the crossmember.

11 Claims, 3 Drawing Sheets

(56) References Cited

U.S. PATENT DOCUMENTS

| | | | | |
|---|---|---|---|---|
| 6,973,984 B2* | 12/2005 | Cheron | ................ | B62D 25/084 180/68.1 |
| 7,988,225 B2* | 8/2011 | Goldsberry | ............ | B60R 19/18 293/133 |
| 9,630,655 B1* | 4/2017 | Lee | ...................... | B62D 25/085 |
| 2002/0178584 A1* | 12/2002 | Wycech | ................ | B60J 5/0452 29/897.2 |
| 2005/0040672 A1* | 2/2005 | Andre | .................... | B60R 21/34 296/187.09 |
| 2008/0038576 A1* | 2/2008 | Riviere | ................ | B62D 25/084 428/586 |
| 2008/0203766 A1* | 8/2008 | Hemmersmeier | ... | B62D 25/084 296/203.02 |
| 2008/0308333 A1* | 12/2008 | Kapadia | ................ | B60K 11/04 180/68.4 |
| 2010/0244487 A1* | 9/2010 | Gonin | .................. | B62D 25/084 296/187.09 |
| 2011/0115241 A1* | 5/2011 | Gonin | .................... | B60R 19/03 293/120 |
| 2011/0221213 A1* | 9/2011 | Riviere | ................ | B62D 21/152 293/132 |
| 2013/0292969 A1* | 11/2013 | Metzner | ............... | B62D 21/152 296/187.09 |
| 2014/0159429 A1* | 6/2014 | Chung | ................ | B62D 25/085 296/193.09 |
| 2015/0343973 A1* | 12/2015 | Stoenescu | ............... | B60R 19/03 293/133 |
| 2017/0282704 A1* | 10/2017 | Gassmann | ............ | B60K 11/04 |
| 2019/0300062 A1* | 10/2019 | Yoo | ........................ | B60R 19/03 |

FOREIGN PATENT DOCUMENTS

| | | |
|---|---|---|
| EP | 2233367 A1 | 9/2010 |
| EP | 2949518 A1 | 12/2015 |
| JP | 2016010983 A | 1/2016 |

* cited by examiner

STRUCTURE FOR A MOTOR VEHICLE FRONT END

The invention relates to a structure for a motor vehicle front end.

A structure for a motor vehicle front end generally comprises an upper cross member rigidly connected to a lower cross member by means of two struts arranged vertically in the motor vehicle.

In a known manner, such a structure for a front end extends in the motor vehicle from a protective molding to a fire wall of the vehicle and is used to rigidly connect an engine compartment and to support a motor fan unit, while forming a separation from the vehicle passenger compartment.

It is known to provide for a degree of deformability of the structure for a front end in order to withstand a collision involving the motor vehicle in an appropriate manner.

The present invention aims to improve the situation by proposing an improved front end structure, particularly in the event of a front impact suffered by the motor vehicle.

To this end, the invention relates to a structure for a motor vehicle front end, comprising a hood cross member and at least one column rigidly connected to the cross member, the cross member extending lengthwise in a so-called main direction, characterized in that said at least one column comprises a first set of reinforcing ribs on at least one portion of an outer surface of said at least one column, each reinforcing rib extending in a direction parallel to the main direction of the cross member.

Thus, unlike in the prior art, due to the reinforcing ribs parallel to the cross member, the structure according to the present invention is configured so that at least one of the columns deforms axially in a compression mode of the structure (longitudinal axis of the vehicle), which provides improved energy absorption in the event of a collision suffered by the motor vehicle.

According to another feature of the invention, said at least one column comprises a second set of reinforcing ribs, said reinforcing ribs of the second set extending parallel to each other and being inclined relative to the reinforcing ribs of the first set on at least one portion of an outer surface of said at least one column.

According to another feature of the invention, the portion of the outer surface on which the first set of reinforcing ribs extends coincides at least partially with the portion of the outer surface on which the second set of reinforcing ribs extends.

According to another feature of the invention, said at least one column comprises at least one reinforcing insert.

According to another feature of the invention, said at least one reinforcing insert has a generally S-shaped profile.

According to another feature of the invention, said at least one reinforcing insert has a closed profile.

According to another feature of the invention, said at least one reinforcing insert is made from a metal or composite material.

According to another feature of the invention, said at least one column defines an inner volume at least one portion of which is hollow.

According to another feature of the invention, the structure comprises an absorbent material in the hollow portion.

Further features and advantages of the invention will become apparent on reading the following description. This is given for purely illustrative purposes and must be read with reference to the attached drawings, in which.

STRUCTURE FOR A MOTOR VEHICLE FRONT END

The invention relates to a structure 1 for a motor vehicle front end.

Figure 1:
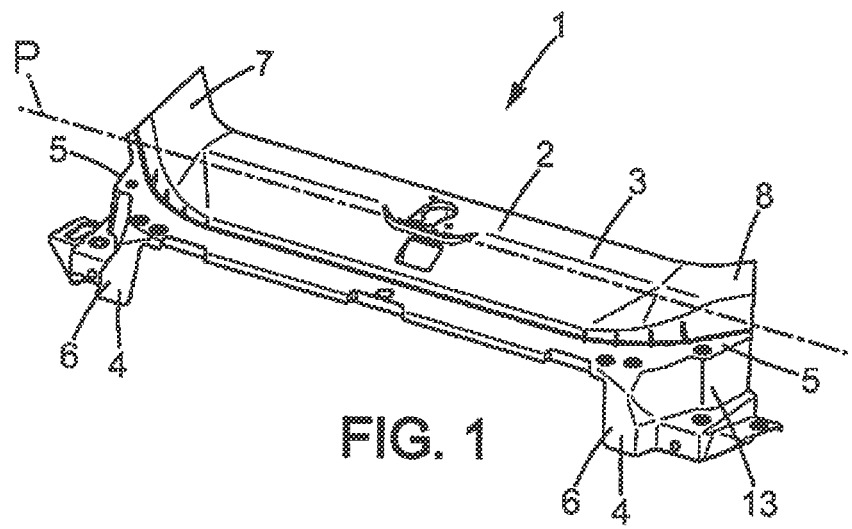
FIG. 1 shows a perspective view of a structure for a motor vehicle front end according to the present invention.

As can be seen in FIG. 1, the structure comprises a cross member with reference sign 2 in the figures.

Preferably, this is the upper cross member of the motor vehicle.

The cross member 2 extends longitudinally in a so-called main direction with reference sign P in FIG. 1.

In an installed position in the motor vehicle, the cross member 2 is arranged horizontally in the motor vehicle, and the direction P is horizontal.

In FIG. 1, the cross member 2 comprises a plate formed by a shell 3.

Of course, the invention is not limited to this configuration of the cross member 2. In particular, the cross member 2 can be formed by two shell halves, an upper shell half and a lower shell half.

As can be seen in FIG. 1, the structure 1 also comprises two columns 4 rigidly connected to the cross member 2.

The invention will be described in the scenario in which the two columns 4 are identical.

However, the invention is not limited to this scenario and columns that are different from each other can be envisaged.

In FIG. 1, each of the columns 4 is rigidly connected by one 5 of the ends 5, 6 thereof to one 7 or other 8 of the ends 7, 8 of the cross member 2.

The end 5 is called the upper end.

The columns 4 extend parallel to each other.

The columns 4 are arranged orthogonally to the main direction P of the cross member 2.

The columns 4 are materially continuous with the cross member 2; in other words, these elements form just a single part.

The columns 4 make it possible to engage with the cross member so as to form a frame for receiving (a) heat exchanger(s) of the motor vehicle.

Preferably, each column 4 has a length approximately 1.5 as great as the height of 25 the cross member 2.

In an installed position in the motor vehicle, the columns 4 are erected approximately vertically.

Figure 2:
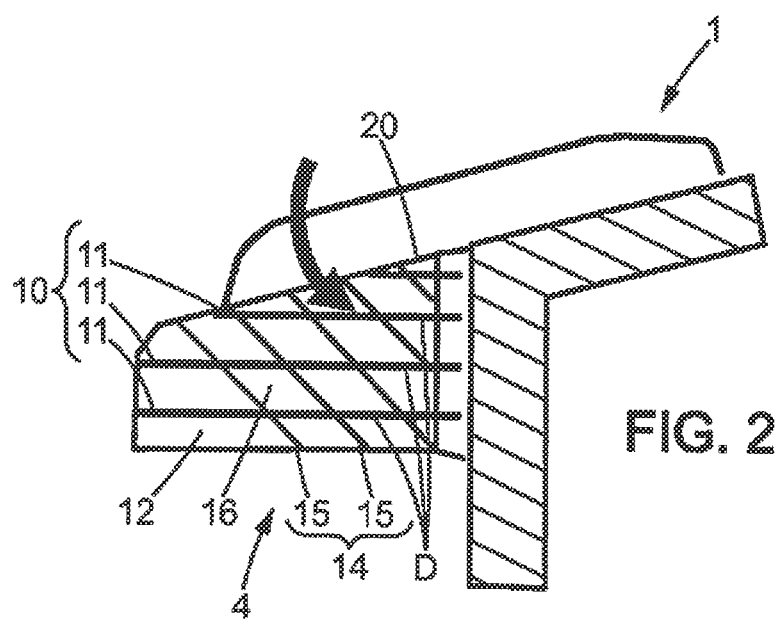
FIG. 2 shows a side view of the structure in FIG. 1.

As can be seen in the figures, and in particular in FIG. 2, each column 4 comprises a first set 10 of reinforcing ribs 11 on at least one portion 12 of an outer surface 13 of the column.

Each reinforcing rib 11 extends preferably in a direction D parallel to the main 35 direction P of the cross member 2.

In position in the motor vehicle, the reinforcing ribs 11 are arranged horizontally.

The reinforcing ribs 11 provide increased strength of the structure 1 in compression of the structure, permitting improved energy absorption in the event of a collision suffered by the motor vehicle.

The reinforcing ribs 11 are also called horizontal ribs 11.

In the embodiments shown, the reinforcing ribs 11 are arranged in a lower portion of the columns 4, that is, in a portion that does not contain the ends 5 for rigid connection of the columns and the cross member 2.

However, it can be envisaged that the reinforcing ribs extend along the entire length of the columns 4, including the end 5 thereof, or that the reinforcing ribs extend solely on an upper portion of the columns 4, including the end 5 thereof.

As can be seen in particular in FIG. 2, each column 4 comprises a second set 14 of reinforcing ribs 15.

The reinforcing ribs 15 extend parallel to each other.

The reinforcing ribs 15 are inclined relative to the horizontal ribs 11 on at least one portion 16 of the outer surface 13.

The reinforcing ribs 15 are also called oblique ribs.

Preferably, the portion 12 of the outer surface 13 on which the first set 10 of reinforcing ribs 11 extends coincides at least partially with the portion 16 of the outer surface 13 on which the second set 14 of oblique ribs 15 extends.

The oblique ribs support the plate of the cross member 2 in the event of a front impact, which prevents the cross member from collapsing on the columns 4.

As can be seen in the figures, the structure 1 is advantageously provided with a 35 reinforcing insert 20.

Preferably, the reinforcing insert 20 is formed from a stronger material than the material forming the columns 4 and the cross member 2.

For example, the reinforcing insert 20 is made from steel, aluminum or a composite material.

Composite material is given to mean a set of at least two non-miscible components, such as for example a combination of a fibrous fabric and a thermoplastic resin matrix.

Figure 3:
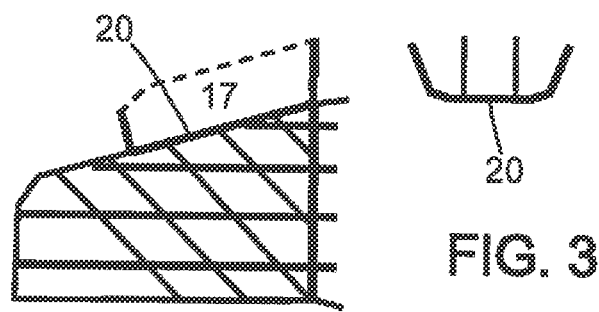
FIG. 3 shows side and cross-sectional views of a detail of the structure in FIG. 2.

As shown in FIG. 3, according to a first variant, the reinforcing insert 20 has a generally U-shaped profile.

Figure 4:
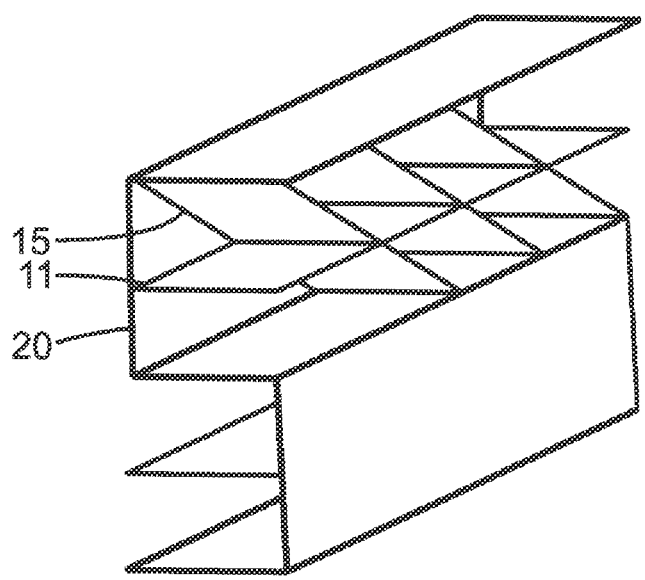
FIG. 4 shows side and cross-sectional views of a detail of the structure in FIG. 2 according to a variant.

According to another variant, shown in FIG. 4, according to a first variant, the reinforcing insert 20 has a generally S-shaped profile.

Figure 5:
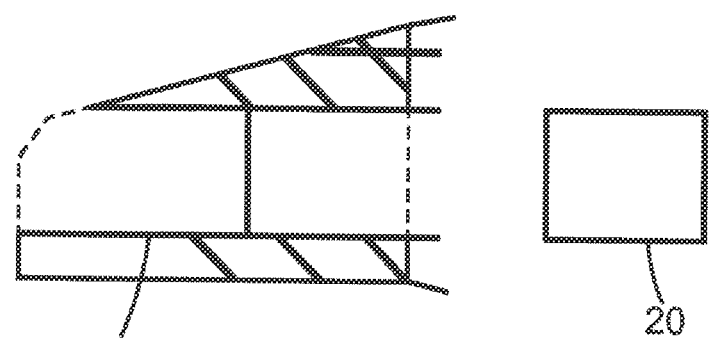
FIG. 5 shows a perspective view of a detail of the structure in FIG. 2 according to another variant.

According to another variant, shown in FIG. 5, according to a first variant, the reinforcing insert 20 has a closed profile.

Advantageously, each column 4 defines an inner volume 17, at least one portion of 20 which is hollow.

In the embodiment shown in FIGS. 2 and 3, the end portion 5 defines the hollow volume 17.

The hollow volume 17 provides improved deformability of the column 4 in the event of an impact of the motor vehicle.

Figure 6:
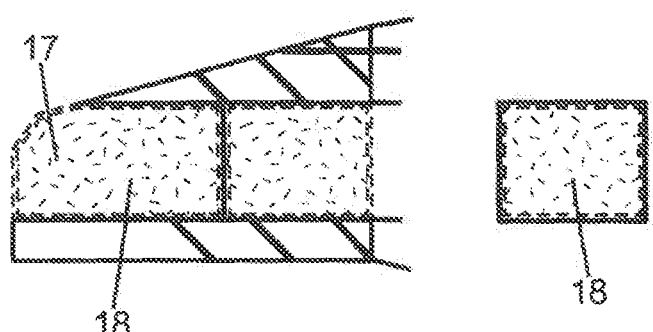
FIG. 6 shows side and cross-sectional views of a detail of a structure for a front end according to another embodiment.

Preferably, as shown in FIG. 6, the hollow volume 17 is filled at least partially with an absorbent material 18, such as foam.

The absorbent material 18 increases the energy absorption of the structure 1 in the event of an impact of the motor vehicle.

Manufacturing Process

The structure 1 is manufactured for example by injection of material into a mold.

Preferably, the insert 20 is overmolded, that is, it is preformed and then inserted into the mold before the injection of material.

In a variant, the formation of the insert 20 coincides with the moment of injection of material into the mold.

Simulation

Figure 7:
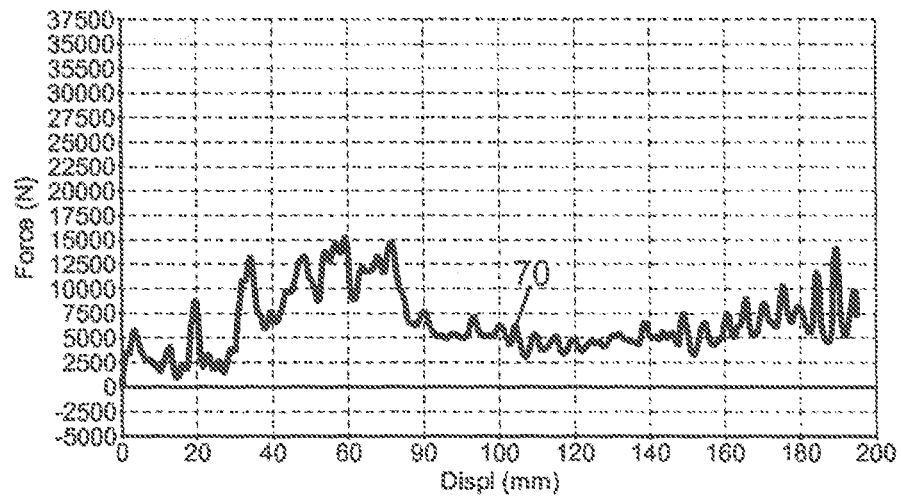
FIGS. 7 and 8 show a change over time in a deformation force of a front end structure of the prior art and of the structure in FIG. 1 respectively.
Figure 8:
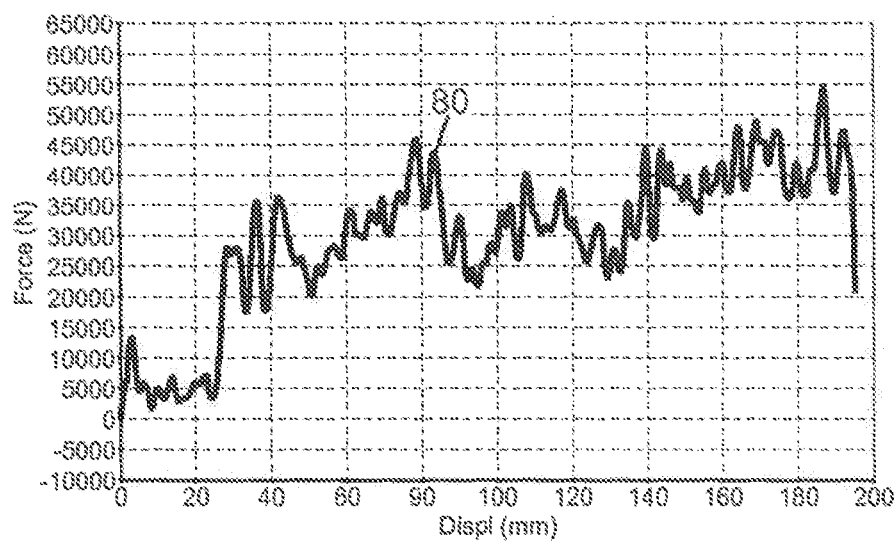

A load applied to a front end structure of the prior art results in a graph 70 (FIG. 7) and a load applied to a front end structure according to the present invention results in a graph 80 (FIG. 8).

According to this graph 70, the structure can withstand a deformation force that increases to 15 kN for a displacement of 60 mm, followed by a drastic reduction in deformation force resulting from the disintegration of the structure.

Conversely, the structure 1 according to the present invention can withstand a deformation force that increases to 40 kN for a displacement of approximately 60 mm, before stabilizing at 40 kN for a displacement of between 60 mm and 200 mm.

Thus, compared to the structure of the prior art, the structure 1 according to the present invention has a greater deformation force and absorbs the energy from a front impact for a greater displacement.

The invention claimed is:

1. A structure for a motor vehicle front end, comprising:
a cross member; and
at least one column rigidly connected to the cross member,
the cross member extending longitudinally in a main direction,
wherein said at least one column comprises a first set of reinforcing ribs molded on at least one portion of an outer surface of said at least one column, each reinforcing rib extending in a direction parallel to the main direction of the cross member,
wherein said at least one column comprises a second set of reinforcing ribs molded on the at least one portion of the outer surface of said at least one column, said reinforcing ribs of the second set extending parallel to each other and being inclined relative to the reinforcing ribs of the first set.

2. The structure as claimed in claim 1, wherein said at least one column comprises at least one reinforcing insert.

3. The structure as claimed in claim 2, wherein said at least one reinforcing insert has a generally S-shaped profile.

4. The structure as claimed in claim 2, wherein said at least one reinforcing insert has a closed profile.

5. The structure as claimed in claim 2, wherein said at least one reinforcing insert is made from a metal or composite material.

6. The structure as claimed in claim 1, wherein said at least one column defines an inner volume at least one portion of which is hollow.

7. The structure as claimed in claim 6, comprising an absorbent material in the hollow portion.

8. The structure as claimed in claim 1, wherein the second set of reinforcing ribs support a plate of the cross member in the event of a front impact, which prevents the cross member from collapsing on the at least one column.

9. The structure as claimed in claim 1, wherein due to each reinforcing rib extending in the direction parallel to the main direction of the cross member, the at least one column deforms axially in a compression mode of the structure, in an event of a collision of the motor vehicle.

10. The structure as claimed in claim 1, wherein each of the at least one column has a length approximately 1.5 times a height of the cross member.

11. The structure as claimed in claim 1, wherein the structure is configured to withstand a deformation force that increases to 15 kN for a displacement of 60 mm.

* * * * *